US010359522B2

(12) United States Patent
Barzilov et al.

(10) Patent No.: US 10,359,522 B2
(45) Date of Patent: Jul. 23, 2019

(54) PHOSWICH DETECTOR WITH FAST NEUTRON SPECTROSCOPY FUNCTION

(71) Applicant: The Board Of Regents Of The Nevada System Of Higher Education On Behalf Of The University of Nevada, Las Vegas, Las Vegas, NV (US)

(72) Inventors: Alexander Barzilov, Henderson, NV (US); Jessica Hartman, Las Vegas, NV (US)

(73) Assignee: The Board of Regents of the Nevada System of Higher Education on Behalf of the University of Nevada, Las Vegas, Las Vegas, NV (US)

( * ) Notice: Subject to any disclaimer, the term of this patent is extended or adjusted under 35 U.S.C. 154(b) by 0 days.

(21) Appl. No.: 16/069,671

(22) PCT Filed: Jan. 13, 2017

(86) PCT No.: PCT/US2017/013318
§ 371 (c)(1),
(2) Date: Jul. 12, 2018

(87) PCT Pub. No.: WO2017/123856
PCT Pub. Date: Jul. 20, 2017

(65) Prior Publication Data
US 2019/0025446 A1    Jan. 24, 2019

Related U.S. Application Data

(60) Provisional application No. 62/279,214, filed on Jan. 15, 2016.

(51) Int. Cl.
*G01T 3/06* (2006.01)

(52) U.S. Cl.
CPC ............... *G01T 3/065* (2013.01); *G01T 3/06* (2013.01)

(58) Field of Classification Search
CPC .................................. G01T 3/06; G01T 3/065
See application file for complete search history.

(56) References Cited

U.S. PATENT DOCUMENTS

| 3,988,586 A | 10/1976 | Stuart et al. |
| 4,090,083 A | 5/1978 | Wyvill |
| 9,081,100 B1 | 7/2015 | Bellinger et al. |
| 2007/0051892 A1 | 3/2007 | Warburton et al. |
| 2007/0069146 A1* | 3/2007 | Neal ............... G01T 1/167 250/390.11 |
| 2013/0195248 A1 | 8/2013 | Rothschild et al. |

(Continued)

FOREIGN PATENT DOCUMENTS

WO    WO 2017/123856    7/2017

OTHER PUBLICATIONS

U.S. Appl. No. 62/279,214, filed Jan. 15, 2016, Alexander Barzilov (University of Nevada, Las Vegas).

(Continued)

*Primary Examiner* — Mark R Gaworecki
(74) *Attorney, Agent, or Firm* — Ballard Spahr LLP (57) ABSTRACT

A phoswich neutron detection system with at least two scintillators, each having differing pulse shape characteristics, and an optical detector, and neutron spectroscopy capability.

6 Claims, 10 Drawing Sheets

(56) References Cited

U.S. PATENT DOCUMENTS

2014/0131620 A1* 5/2014 Walker .................. C09K 11/06
252/301.17
2014/0151567 A1* 6/2014 Slaughter ................ G01T 3/065
250/367

OTHER PUBLICATIONS

Hartman, J. and Barzilov, A., Application of Wavelet Unfolding Technique in Neutron Spectroscopic Analysis. Phys Proc. 2015; 66:410-5.
Mayer et al., Development and Characterization of a Neutron Detector Based on a Lithium Glass-Polymer Composite. Nuc Instrum Meth Phys Res A. 2015; 785:117-22.
International Search Report and Written Opinion dated Apr. 6, 2017 by the International Searching Authority for Patent Application No. PCT/US2017/013318, which was filed on Jan. 13, 2017 and published as WO 2017/123856 dated Jul. 20, 2017 (Inventor—Barzilov et al.; Applicant-Board of Regents of the Nevada System of Higher Education on Behalf of the University of Nevada, Las Vegas; (7 pages).
International Preliminary Report on Patentability dated Jul. 17, 2018 by the International Searching Authority for Patent Application No. PCT/US2017/013318, which was filed on Jan. 13, 2017 and published as WO 2017/123856 dated Jul. 20, 2017 (Inventor—Barzilov et al.; Applicant-Board of Regents of the Nevada System of Higher Education on Behalf of the University of Nevada, Las Vegas; (6 pages).

* cited by examiner

PHOSWICH DETECTOR WITH FAST NEUTRON SPECTROSCOPY FUNCTION

CROSS-REFERENCE TO RELATED APPLICATION

The present application is a national phase filing under 35 U.S.C. § 371 of International Application No. PCT/US2017/013318, filed on Jan. 13, 2017, which claims priority to U.S. provisional application Ser. No. 62/279,214, filed on Jan. 15, 2016, the contents of which are both incorporated herein by reference in their entirety.

FIELD OF INVENTION

This disclosure relates generally to neutron detection systems, and methods for the manufacture and use thereof.

BACKGROUND

The ability to detect fissile materials is an important step in achieving nuclear nonproliferation goals and ensuring the safety and security of nuclear facilities. Nuclear materials can be characterized by measurement of prompt and delayed neutrons and photons emitted in spontaneous or induced fission events.

Conventional thermal neutron detection systems employ Helium-3 based detectors that require moderation of neutrons prior measurement and can have limitations on count rate. As a result, a neutron's energy data and the event's timing information may be lost or distorted during the moderation process. Neutron sources typically emit high energy neutrons ("fast" neutrons). Recent shortages of Helium-3 add additional challenges to neutron detection that must be addressed.

The detection and monitoring of radiation sources in remote areas or facilities with limited physical access can require rugged, portable, and low power detection systems for the measurement and analysis of radiation. Accordingly, a need exists for improved detection systems. This need and other needs are satisfied by the various aspects of the present disclosure.

SUMMARY OF THE INVENTION

In accordance with the purposes of the invention, as embodied and broadly described herein, the invention provides.

In one aspect, the present disclosure provides a neutron detection system comprising a plurality of scintillators and an optical detector.

In another aspect, the present disclosure provides a method for detecting neutrons, the method comprising exposing a neutron detector comprising a plurality of scintillators, each having differing pulse shape characteristics, and an optical detector, to an area of interest, detecting a signal, if present, from the optical detector, and then analyzing the signal using a spectral unfolding technique to separate underlying signals arising from thermal neutrons, fast neutrons, and photons.

While aspects of the present invention can be described and claimed in a particular statutory class, such as the system statutory class, this is for convenience only, and one of skill in the art would understand that each aspect of the present invention can be described and claimed in any statutory class. Unless otherwise expressly stated, it is no way intended that any method or aspect set forth herein be construed as requiring that its steps be performed in a specific order. Accordingly, where a method claim does not specifically state in the claims or description that the steps are to be limited to a specific order, it is no way intended that an order be inferred in any respect.

Additional aspects of the invention will be set forth in part in the description which follows, and in part will be obvious from the description, or can be learned by practice of the invention. The advantages of the invention will be realized and attained by means of the elements and combinations particularly pointed out in the appended claims. It is to be understood that both the foregoing general description and the following detailed description are exemplary and explanatory only and are not restrictive of the invention, as claimed.

BRIEF DESCRIPTION OF THE DRAWINGS

The accompanying figures, which are incorporated in and constitute a part of this specification, illustrate several aspects and together with the description serve to explain the principles of the invention.

FIG. 7 illustrates a (a) PSD plot and (b) the corresponding plot of counts vs. the PID value, in accordance with various aspects of the present disclosure.

FIG. 8 illustrates a comparison of total response function measured for neutron and gamma-ray components for incident neutron energies of: (a) 6.49 MeV, (b) 8.24 MeV, and (c) 12.20 MeV, in accordance with various aspects of the present disclosure.

FIG. 10 illustrates detector responses to incident neutrons with energies of (1) 0.12 MeV to 1.77 MeV, (b) 1.89 MeV to 4.51 MeV, (c) 4.77 MeV to 8.24 MeV, and (d) 12.20 MeV to 20.20 MeV, in accordance with various aspects of the present disclosure.

DETAILED DESCRIPTION

The present invention can be understood more readily by reference to the following detailed description of the invention.

Before the present compounds, compositions, articles, systems, devices, and/or methods are disclosed and described, it is to be understood that they are not limited to specific synthetic methods unless otherwise specified, or to particular reagents unless otherwise specified, as such can, of course, vary. It is also to be understood that the terminology used herein is for the purpose of describing particular aspects only and is not intended to be limiting. Although any methods and materials similar or equivalent to those described herein can be used in the practice or testing of the present invention, exemplary methods and materials are now described.

Moreover, it is to be understood that unless expressly stated otherwise, it is in no way intended that any method set forth herein be construed as requiring that its steps be performed in a specific order. Accordingly, where method claim does not actually recite an order to be followed by its steps or it is not otherwise specifically stated in the claims or descriptions that the steps are to be limited to a specific order, it is no way intended that an order be inferred, in any respect.

All publications mentioned herein are incorporated herein by reference to disclose and describe the methods and/or materials in connection with which the publications are cited.

A. Definitions

It is also to be understood that the terminology used herein is for the purpose of describing particular aspects only and is not intended to be limiting. As used in the specification and in the claims, the term "comprising" can include the aspects "consisting of" and "consisting essentially of" Unless defined otherwise, all technical and scientific terms used herein have the same meaning as commonly understood by one of ordinary skill in the art to which this invention belongs. In this specification and in the claims which follow, reference will be made to a number of terms which shall be defined herein.

As used in the specification and the appended claims, the singular forms "a," "an" and "the" include plural referents unless the context clearly dictates otherwise. Thus, for example, reference to "an input" includes two or more inputs.

As used herein, the terms "about" and "at or about" mean that the amount or value in question can be the value designated some other value approximately or about the same. It is generally understood, as used herein, that it is the nominal value indicated up to ±10% variation unless otherwise indicated or implied. The term is intended to convey that similar values promote equivalent results or effects recited in the claims. That is, it is understood that amounts, sizes, formulations, parameters, and other quantities and characteristics are not and need not be exact, but can be approximate and/or larger or smaller, as desired, reflecting tolerances, conversion factors, rounding off, measurement error and the like, and other factors known to those of skill in the art. In general, an amount, size, formulation, parameter or other quantity or characteristic is "about" or "approximate" whether or not expressly stated to be such. It is understood that where "about" is used before a quantitative value, the parameter also includes the specific quantitative value itself, unless specifically stated otherwise.

Ranges can be expressed herein as from "about" one particular value, and/or to "about" another particular value. When such a range is expressed, another aspect includes from the one particular value and/or to the other particular value. Similarly, when values are expressed as approximations, by use of the antecedent 'about,' it will be understood that the particular value forms another aspect. It will be further understood that the endpoints of each of the ranges are significant both in relation to the other endpoint, and independently of the other endpoint. It is also understood that there are a number of values disclosed herein, and that each value is also herein disclosed as "about" that particular value in addition to the value itself. For example, if the value "10" is disclosed, then "about 10" is also disclosed. It is also understood that each unit between two particular units are also disclosed. For example, if 10 and 15 are disclosed, then 11, 12, 13, and 14 are also disclosed.

The terms "first," "second," "first part," "second part," and the like, where used herein, do not denote any order, quantity, or importance, and are used to distinguish one element from another, unless specifically stated otherwise.

As used herein, the terms "optional" or "optionally" means that the subsequently described event or circumstance can or cannot occur, and that the description includes instances where said event or circumstance occurs and instances where it does not.

Moreover, it is to be understood that unless otherwise expressly stated, it is in no way intended that any method set forth herein be construed as requiring that its steps be performed in a specific order. Accordingly, where a method claim does not actually recite an order to be followed by its steps or it is not otherwise specifically stated in the claims or descriptions that the steps are to be limited to a specific order, it is no way intended that an order be inferred, in any respect. This holds for any possible non-express basis for interpretation, including: matters of logic with respect to arrangement of steps or operational flow; plain meaning derived from grammatical organization or punctuation; and the number or type of aspects described in the specification.

Disclosed are materials to be used in the preparation of components of the invention, the components of the invention themselves, and methods for the manufacture and use of such components. These and other materials are disclosed herein, and it is understood that when combinations, subsets, interactions, groups, etc. of these materials are disclosed that while specific reference of each various individual and collective combinations and permutation of these materials cannot be explicitly disclosed, each is specifically contemplated and described herein. For example, if a particular component is disclosed and discussed and a number of modifications that can be made to a number of materials including the components are discussed, specifically contemplated is each and every combination and permutation of the components and the modifications that are possible unless specifically indicated to the contrary. Thus, if a class of materials A, B, and C are disclosed as well as a class of materials D, E, and F and an example of a combination materials, A-D is disclosed, then even if each is not individually recited each is individually and collectively contemplated meaning combinations, A-E, A-F, B-D, B-E, B-F, C-D, C-E, and C-F are considered disclosed. Likewise, any subset or combination of these is also disclosed. Thus, for example, the sub-group of A-E, B-F, and C-E would be considered disclosed. This concept applies to all aspects of this application including, but not limited to, steps in methods of making and using the compositions of the invention. Thus, if there are a variety of additional steps that can be performed it is understood that each of these additional steps can be performed with any specific aspect or combination of aspects of the methods of the invention.

As used herein, the term or phrase "sufficient," "sufficient thickness," "sufficient amount," or "conditions sufficient to" refers to such thickness, amount or condition that is capable of performing the function or property for which a sufficient thickness or amount is expressed. As will be pointed out below, the exact thickness, amount, or particular condition required can vary from one aspect to another, depending on recognized variables such as the materials employed and the processing conditions observed; however, it should be understood that an appropriate effective thickness, amount, or condition could be readily determined by one of ordinary skill in the art in possession of this disclosure using only routine experimentation.

As used herein, the terms "scintillators" and "cells" can be used interchangeably and are intended to refer to a material that can exhibit scintillation (i.e., the property of luminescence) when excited by ionizing radiation.

As used herein, the term "substantially," when used in reference to a composition, refers to more than about 98% by weight, more than about 98.5% by weight, more than about 99% by weight, more than about 99.5% by weight, or more than about 99.9% by weight, based on the total weight of the composition, of a specified feature or component.

It is understood that the devices disclosed herein have certain functions. Disclosed herein are certain structural requirements for performing the disclosed functions and it is understood that there are a variety of structures that can perform the same function that are related to the disclosed structures, and that these structures will typically achieve the same result.

Phoswich Neutron Detection System

As briefly described above, the ability to detect fissile materials is of great importance in achieving nuclear non-proliferation goals and ensuring the safety of nuclear facilities. Detection of these materials requires technologies capable of measuring and assessing the radiation signatures of fission events. Neutrons produced in spontaneous or induced fission reactions are mainly fast neutrons, such as, for example, from the fission of $^{235}U$ and $^{239}Pu$, or from the fusion of deuterium and tritium isotopes, and the energy and timing information about these neutrons can allow for characterization of nuclear materials and neutron sources.

In one aspect, the present invention provides a neutron detection system. In another aspect, the present invention provides a method for detecting and measuring neutrons, such as, for example, fast neutrons. In another aspect, the neutron detection system comprises a phoswich, or phosphor sandwich. In still another aspect, the present invention provides a method for detecting neutrons and analyzing single information from a detector to provide information related to one or more of neutron energy, neutron flux, time of neutron measurement, and/or the type of and/or location of a neutron source.

In some aspects, the neutron detection system described herein can comprise a plurality of scintillators. In yet other aspects, the neutron detection system described herein can comprise a plurality of scintillators and an optical detector. In a further aspect, the present disclosure provides a neutron detection system comprising at least two scintillators, at least one of which is a plastic scintillator. In still a further aspect, the present invention provides a solid state neutron detection system. In yet another aspect, the present invention provides an encapsulated system for neutron detection, combined with analytical capabilities for signal processing. In another aspect, the neutron detection system of the present invention can provide on-the-fly or real-time digital processing of signals received by the detection system.

In one aspect, the neutron detection system of the present invention can separate and/or discriminate between neutrons and gamma radiation. In another aspect, the neutron detection system of the present invention can separate and/or discriminate between fast neutrons, thermal neutrons, and photons. In another aspect, the neutron detection system exhibits on-the-fly or a real-time pulse shape discrimination, effectively segregating pulses with different time constants, and can provide relative and absolute counts of thermal neutrons, fast neutrons, and gamma rays. In still further aspects, the neutron detection system described herein can be able to detect and discriminate between thermal neutrons, fast neutrons, and photons. In other aspects, the neutron detection system of the present invention can be used in conjunction with a neutron source, such as, for example, an accelerator-based neutron source. In such aspects, the neutron detection system can provide real-time monitoring of neutron energy and flux, and can provide feedback to the neutron source. In another aspect, the neutron detection system can comprise a portable neutron detector that can be easily transported and utilized in remote monitoring applications. In such an aspect, the portable neutron detector can provide information on neutron energy and flux, along with information regarding the location of the neutron source. In one aspect, the neutron detection system comprises a rugged, portable, and low power consumption system suitable for use in a variety of operating environments.

In still other aspects, the neutron detection system of the present invention comprises signal processing capabilities for analyzing neutron-induced signals, including the use of spectral unfolding techniques using wavelets.

In one aspect, the neutron detection system of the present disclosure comprises a plurality of scintillators and a detector. In certain aspects, the scintillators and the detector are arranged in a phosphor sandwich. In still other aspects, the neutron detection system of the present invention comprises a plurality of scintillators and an optical detector, arranged in a phosphor sandwich.

In some aspects, the neutron detection system described herein comprises at least one scintillator capable of detecting thermal neutrons, at least one scintillator capable of detection fast neutrons and photons, and the optical detector.

In one aspect, the neutron detection system comprises a $^6Li$ (lithium-6) cell or $^6Li$ (lithium-6) scintillator. In other aspects, the neutron detection system comprises a plastic scintillator. In still further aspects, the neutron detection system comprises an optical detector. In some aspects, the optical detector can be a photomultiplier tube. In one aspect, the neutron detection system comprises a $^6Li$ (lithium-6) cell or $^6Li$ (lithium-6) scintillator, a plastic scintillator, and an optical detector, such as, for example, a photomultiplier tube. In one aspect, at least one of the plurality of scintillators comprises a low-energy neutron absorber comprising $^6Li$ (lithium-6), such as, for example, lithium loaded glass.

In some aspects, at least one of the plurality of scintillators comprises a plastic scintillator. In yet other aspects, the neutron detection system can comprise at least one $^6Li$ scintillator, at least one plastic scintillator, and the optical detector.

In another aspect, at least one of the plurality of scintillators comprises a plastic scintillator, capable of detecting fast neutrons. In certain aspects, each of the scintillators has different pulse shape characteristics. In yet other aspect, each of the scintillators has different pulse shape characteristics, such that the signals from each scintillator can be separately identified and/or monitored. In certain aspects, the neutron detection system can optionally comprise a power supply. In other aspects, the neutron detection system can optionally comprise a data acquisition and/or signal processing unit. In still further aspects, the neutron detection system can optionally comprise an output device. The neutron detection system optionally comprises a power supply, a data acquisition and/or signal processing unit, an output device, or a combination thereof. In still further aspects, the neutron detection system described herein can comprise a power supply and a signal processing unit. In another aspect, the neutron detection system can comprise a wireless communication module that can enable wireless communication to a separate data acquisition and/or signal processing unit. The neutron detection system can further optionally comprise a global positioning system (GPS) sensor, such that the location of measurements can be tracked and/or position information can be relayed to a remote signal processing unit. In one aspect, a scintillator can comprise a cerium (Ce)-doped cell or cerium (Ce) doped scintillator. In other aspects, a scintillator can comprise a low-energy neutron scintillator, for example, other than a Ce-doped cell.

In one aspect, the scintillators are in optical contact with the optical detector, such that photons generated in the scintillators can be detected by the optical detector. In various aspects, the optical detector can comprise a photomultiplier tube (PMT), a photodiode array, or any other optical detector suitable for use in the neutron detection system. In still further aspects, the optical detector can comprise a photomultiplier tube, a photodiode, a solid-state photomultiplier array, or a combination thereof. Optical detectors are commercially available, and one of skill in the art, in possession of this disclosure, could identify a suitable optical detector fur use in the neutron detection system. The connection between the scintillators and the optical detector can comprise a lens, an optical grease, or other material to assist in the transmission of photons from the scintillator to the optical detector. In other aspects, the optical detector is shielded from ambient light and/or extraneous photons, such that the only photons reaching the optical detector are generated by the scintillators. In various aspects, such shielding can comprise a housing.

The neutron detection system can comprise a power supply, such as, for example, a high-voltage power supply. The specific properties of a power supply, if present, can vary depending upon the optical detector utilized and the particular application (e.g., portable or affixed system). Power supplies are commercially available and one of skill in the art could readily identify an appropriate power supply for a given neutron detection system configuration. The neutron detection system can also comprise a data acquisition and/or a signal processing unit to analyze signals from the scintillators and optical detector. The neutron detection system can also optionally comprise an output device for displaying neutron and photon information and/or for relaying such information to another system (e.g., control system for a neutron source).

In one aspect, the neutron detection system comprises a material capable of absorbing low energy neutrons, such as, for example, $^6$Li loaded glass (lithium cell). In another aspect, any other material suitable for absorbing low energy neutrons can be utilized in lieu of or in addition to a lithium cell. In one aspect, the lithium cell provides high efficiency for thermal neutrons, with a time constant for scintillation of about 60 ns. In other aspects, the lithium cell can have different time constant due to, for example, fast-neutron and/or photon interactions.

In one aspect, the present disclosure provides a neutron detection technology comprising a plastic scintillator. For neutron detection, plastic scintillators can provide one or more advantages over conventional liquid scintillators, which can be fragile and expensive. Moreover, solvent impurities in conventional liquid scintillators can result in inconsistent detection and quantitation of neutrons. For example, pulse height can vary by as much as 100% due to the presence or concentration of impurities within samples. In addition, liquid scintillators suffer from concerns regarding toxicity, flammability, and limited temperature range, which render their use in the field difficult and unreliable.

In contrast, plastic scintillators typically comprise a solid composition of organic scintillating molecules in a polymerized solvent. Due to the ease with which these materials can be shaped and fabricated, plastic scintillators can be useful and provide advantages in many applications. In one aspect, plastic scintillators can provide increased durability over conventional liquid scintillators. In another aspect, plastic scintillators can be manufactured in a variety of sizes and shapes to accommodate specific instrument designs and applications. In yet another aspect, plastic scintillators are typically nontoxic and nonflammable, making them safer to use than liquid scintillators. Plastic scintillators can also be more economical than liquid scintillators, especially in certain applications.

In various aspects, the plastic scintillator of the present invention has one or more of the following: a high concentration of hydrogen, a high scintillation efficiency, stability and the ability to operate continuously in environments where nuclear materials can be present, including water, dilute acids and alkalis, lower alcohols, and silicone greases.

In one aspect, the neutron detection technology of the present invention can comprise any plastic scintillator capable of providing one or more of the desired properties recited above. In another aspect, the neutron detection technology can comprise any plastic scintillator capable of withstanding and operating in an environment where nuclear materials can be present.

In one aspect, the neutron detection technology of the present invention can comprise a plastic scintillator, such as, for example, an EJ-299-33A, manufactured by Eljen Technology (Sweetwater, Tex., USA). The EJ-299-33A plastic scintillator is a solid state scintillator, based on a polyvinyltoluene matrix loaded with the fluorescent and/or dye compounds, such as 2,5-diphenyloxazole and 9,10-diphenylanthracene. In another aspect, a plastic scintillator can comprise a solid state scintillator, based on a polyvinyltoluene matrix loaded with fluorescent and dye compounds, such as 2,5-diphenyloxazole and 9,10-diphenylanthracene. The resulting plastic has a density of 1.08 g/cm$^3$, with $5.13 \times 10^{22}$ hydrogen atoms, $4.86 \times 10^{22}$ carbon atoms, and $3.55 \times 10^{22}$ electrons per cm$^3$. The resulting light output is specified as 56% of that of anthracene, with a scintillation efficiency for photons of 8600 per 1-MeV electron. The wavelength of maximum emission for the plastic material is 420 nm, and the plastic scintillator is stable in water, dilute acids and alkalis, lower alcohols, and silicone greases. It can also be used safely with most epoxides and glues. In still other aspects, the neutron detection technology can comprise plastic scintillators other than an EL-299-33A.

In one aspect, the plastic scintillator can have a time constant from gamma scattered Compton electrons of about 4 ns, and can have high efficiency for fast-neutron-induced light emission with a time constant of 30 ns. In one aspect, a plastic scintillator can be characterized prior to use, for example, by exposing the scintillator to a monoenergetic neutrons.

Figure 1:
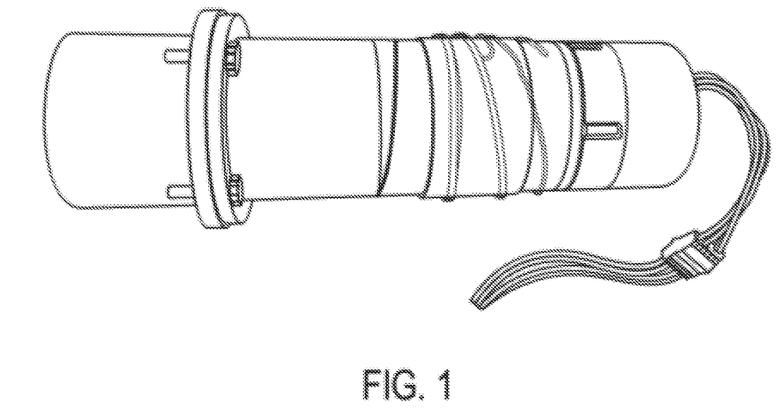
FIG. 1 illustrates an exemplary neutron detector with an attached high-voltage power base, in accordance with various aspects of the present disclosure.
Figure 2:
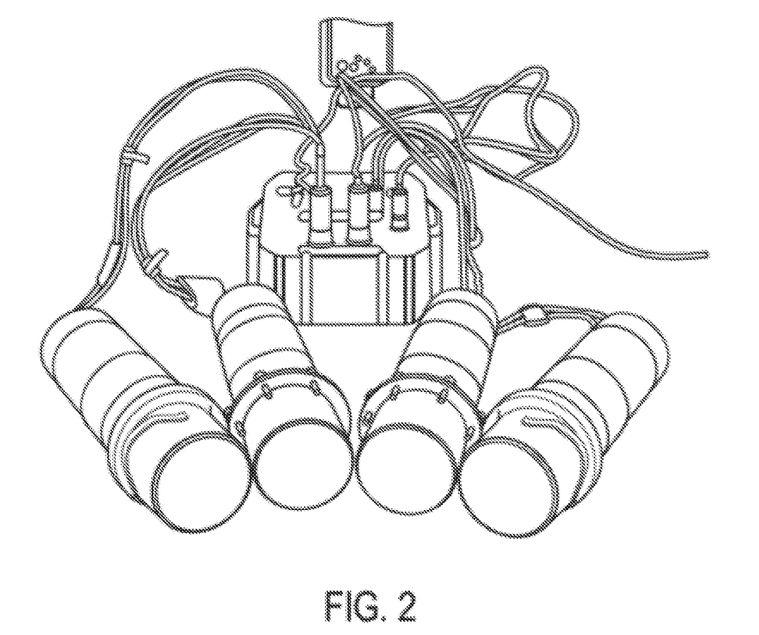
FIG. 2 illustrates an exemplary neutron detector array, in accordance with various aspects of the present disclosure.

In an exemplary aspect, a basic neutron detector can be assembled using an EJ-299-33A plastic scintillator and a photomultiplier tube (PMT), as illustrated in FIG. 1. This exemplary aspect can detect fast neutrons and can be a precursor to the inventive phoswich detector. In such an aspect, a 10 stage PMT (e.g., B51B03, available from ADIT, Sweetwater, Tex., USA) can be used, and the scintillator and PMT can be positioned within a housing designed to protect the components and prevent ambient light from reaching the PMT. Power can be supplied to the PMT, for example, to provide a positive high-voltage supply to dynodes. Additional electrical connections can be made between the digitizer and a signal processing unit. Similarly, an array of individual neutron detectors can be assembled, wherein each individual detector comprises a plastic scintillator and a 10-stage PMT, as illustrated in FIG. 2. It should be understood that any of the features of these exemplary aspects can be applied to various aspects of the invention.

The physical arrangement of each of the scintillators and the optical detector can vary, so long as output from the scintillators is in optical communication with and can be detected by the optical detector. In one aspect, the scintillators can be arranged in a linear manner, such that the scintillators can receive neutrons in a first direction and can emit photons in a second direction towards the input of the optical detector. In still another aspect, the plurality of scintillators and the optical detector can be arranged along an optical path, such that neutrons incident on each of the plurality of scintillators generate scintillation photons detectable by the optical detector. In one aspect, the scintillators can be arranged such that neutrons can impinge on a lithium cell, and wherein a plastic cell can be positioned on an opposing side of the lithium cell.

Figure 3:
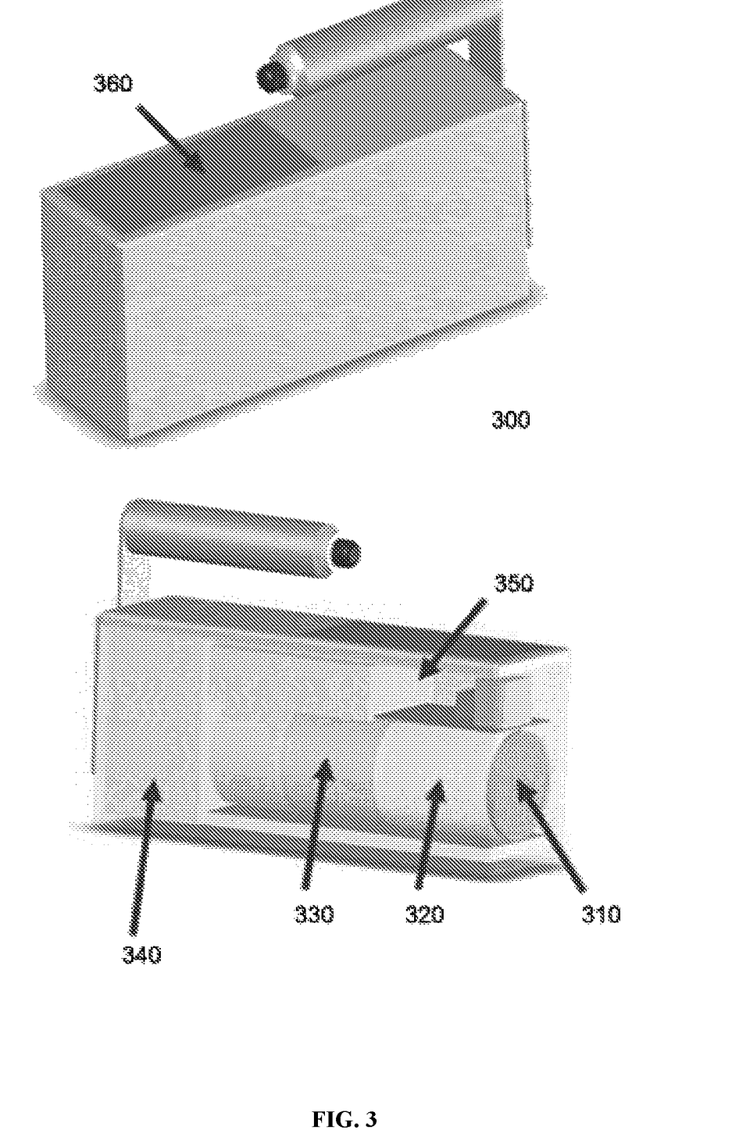
FIG. 3 illustrates an exemplary phoswich neutron detection system, in accordance with various aspects of the present disclosure.

FIG. 3 illustrates an exemplary, portable, phoswich neutron detection system 300, wherein a lithium cell 310, a plastic scintillator 320, and a photodiode 330 are positioned along an optical path, such that neutrons impinging on the detector can react with the lithium cell and/or the plastic scintillator, and the resulting scintillation photons can be detected and quantitated by the optical detector (e.g., a photodiode array). The exemplary, portable, neutron detection system can also comprise a battery or power supply 340, associated electronics 350, and an input and/or output device, such as, for example, a touch screen display 360.

The phoswich neutron detection system can be configured and operated as a portable detector, for use in locating and/or quantitating neutrons. Portable detectors can be useful in assessing sites subject to nonproliferation efforts. In some aspects the neutron detection system described herein can be exposed to an area of interest. In one aspect, the area of interest can be a target location. The phoswich neutron detection system can also be configured and deployed as a permanent or semi-permanent system for use in detecting radiation in shipping containers or trucks, or for use in the operation of neutron sources, such as accelerators. In certain aspects, the area of interest comprises one or more of a shipping container, truck, nonproliferation site, nuclear material, or a combination thereof.

Data Analysis

As described above, the output signal from the optical detector can be transmitted to a signal processing unit, wherein digital pulse-shape discrimination can be used to separate neutron and photon signals. Neutron energy spectroscopy, using spectral unfolding techniques, can enable quick analysis of the polyenergetic neutron data. Signals from each of the scintillators can be identified and segregated to enable measurement of fast neutrons, thermal neutrons, and gamma radiation. In another aspect, wavelet theory can be utilized in analysis of the signals.

In one aspect, the optical detector's signal output can be directly processed using, for example, a compact, low-power, 12-bit, 100-MHz digitizer, so as to preserve pulse shapes with a programmable gain. The resulting digital image of a pulse waveform can be processed in real time by a programmable logic gate array (FPGA), to segregate pulses having different time constants and provide relative and absolute counts of thermal neutrons, fast neutrons, and gamma rays.

In one aspect, the detector response to a polyenergetic neutron flux can be unfolded using a multiple linear regression method. Such a method yields the intensities of neutron flux of a particular energy, hence, enabling spectroscopic analysis. Wavelet theory can be utilized for the unfolding of neutron spectra using the scintillator's monoenergetic response functions, for example, between 1 MeV and 14 MeV either experimentally measured or computed with the MCNPX or similar codes.

In one aspect, monoenergetic neutron response functions can be measured for the plastic scintillator. For example, a Van de Graaff accelerator can be used to produce proton and deuteron beams for reactions with gaseous tritium and deuterium targets, yielding monoenergetic neutrons by means of the $^3$H(p,n)$^3$He, $^2$H(d,n)$^3$He, and $^3$H(d,n)$^4$He reactions. Neutron energy can be selected by tuning the charged-particle's energy and using the angular dependence of the neutron emission. The resulting detector's response functions can then be measured for neutron energy values ranging from 0.1 MeV to 8.2 MeV and from 12.2 MeV to 20.2 MeV.

Processing the data using a procedure for digital pulse-shape discrimination allows for the characterization of response functions of the plastic scintillator to, for example, neutrons only.

The invention can be described in any one or more of the following non-limiting aspects:

Aspect 1: A neutron detection system comprising a plurality of scintillators and an optical detector.

Aspect 2: The neutron detection system of Aspect 1, wherein at least one of the scintillators comprises a $^6$Li loaded glass.

Aspect 3: The neutron detection system of Aspect 1, wherein at least one of the scintillators comprises a plastic scintillator.

Aspect 4: The neutron detection system of Aspect 3, wherein the plastic scintillator comprises a plastic scintillator comprising a polyvinyltoluene matrix loaded with fluorescent and/or dye compounds.

Aspect 5: The neutron detection system of Aspect 1, wherein each of the plurality of scintillators exhibits different pulse shape characteristics.

Aspect 6: The neutron detection system of Aspect 1, wherein the optical detector comprises a photomultiplier tube, a photodiode, a solid-state photomultiplier array, or a combination thereof.

Aspect 7: The neutron detection system of Aspect 1, comprising at least one scintillator capable of detecting thermal neutrons, at least one scintillator capable of detecting fast neutrons and photons, and the optical detector.

Aspect 8: The neutron detection system of Aspect 1, comprising at least one scintillator, at least one plastic scintillator, and the optical detector.

Aspect 9: The neutron detection system of Aspect 1, further comprising a power supply and a signal processing unit.

Aspect 10: The neutron detection system of Aspect 1, wherein the plurality of scintillators and the optical detector are arranged along an optical path, such neutrons incident on each of the plurality of scintillators generate scintillation photons detectable by the optical detector.

Aspect 11: The neutron detection system of Aspect 1, wherein the plurality of scintillators and the optical detector are disposed in a housing that shields the plurality of scintillators and the optical detector from ambient light.

Aspect 12: The neutron detection system of Aspect 1, being able to detect and discriminate between thermal neutrons, fast neutrons, and photons.

Aspect 13: The neutron detection system of Aspect 1, wherein the plurality of scintillators and the optical detector are a portion of a portable instrument capable of measuring neutron flux.

Aspect 14: The neutron detection system of Aspect 1, being capable of providing information on neutron energy and/or flux to a neutron source or an operator thereof.

Aspect 15: A method for detecting neutrons, the method comprising exposing a neutron detector comprising a plurality of scintillators, each having differing pulse shape characteristics, and an optical detector, to an area of interest, detecting a signal, if present, from the optical detector, and then analyzing the signal using a spectral unfolding technique to separate underlying signals arising from thermal neutrons, fast neutrons, and photons.

Aspect 16: The method of Aspect 15, wherein the plurality of scintillators comprises a $^6$Li scintillator and a plastic scintillator.

Aspect 17: The method of Aspect 15, wherein the optical detector comprises a photomultiplier tube, a solid-state photomultiplier array, a photodiode, or a combination thereof.

Aspect 18: The method of Aspect 15, wherein analyzing the signals utilizes wavelet theory.

Aspect 19: The method of Aspect 15, wherein the neutron detection system is portable, and wherein the area of interest comprises one or more of a shipping container, truck, nonproliferation site, nuclear material, or a combination thereof.

Aspect 20: The method of Aspect 15, wherein the area of interest comprises a neutron source, and wherein information related to neutron energy and/or neutron flux is transmitted to the neutron source or an operator thereof, such that the neutron source can maintain a constant neutron output.

EXAMPLES

The following examples are put forth so as to provide those of ordinary skill in the art with a complete disclosure and description of how the compounds, compositions, articles, devices, and/or methods described and claimed herein are made and evaluated, and are intended to be purely exemplary and are not intended to limit the scope of what the inventors regard as their invention. Efforts have been made to ensure accuracy with respect to numbers (e.g., amounts, temperature, etc.) but some errors and deviations should be accounted for. Unless indicated otherwise, parts are parts by weight, temperature is in ° C. or is at ambient temperature, and pressure is at or near atmospheric. Only reasonable and routine experimentation will be required to optimize such process conditions

Example 1—Measurement of Response Functions of EJ-299-33A Plastic Scintillator for Fast Neutrons In one example, a single scintillator detector was assembled using an EJ-299-33A scintillator and a photomultiplier tube. A 10 stage B51B03 PMT from ADIT was selected based on the acceptable gain and wavelength matching. Component housings were designed for scintillator protection as well as to prevent ambient light from reaching the PMT. A power base was attached to the PMT in order to provide a positive high voltage supply to dynodes as well as transmission of the data between the detector and the digitizer. The base housed a miniature voltage generator and a fully transistorized HV divider chain, which provided high drive strength at very low power consumption. It carried power and the controls, and the serial peripheral interface bus for the temperature sensor and the PMT anode signal. The base was connected to a digital acquisition unit.

The 12-bit 100-MHz waveform digitizer eMorpho (Bridgeport Instruments) was used to process data collected during measurements. This digitizer functioned as a multi-channel analyzer (MCA), processing the scintillator light pulses, preserving the pulse shape with a programmable gain, and producing the energy spectrum. Using this digitizer, digital signal processing could be performed with data recorded in list mode as well as on-the-fly pulse-shape analysis of incoming waveforms. The list mode capabilities made it possible to record the partial integrals of the signal waveform that correspond to the beginning part of the pulse, time, and energy (a full integral under each pulse) of each scintillation event while performing measurements.

Figure 4:
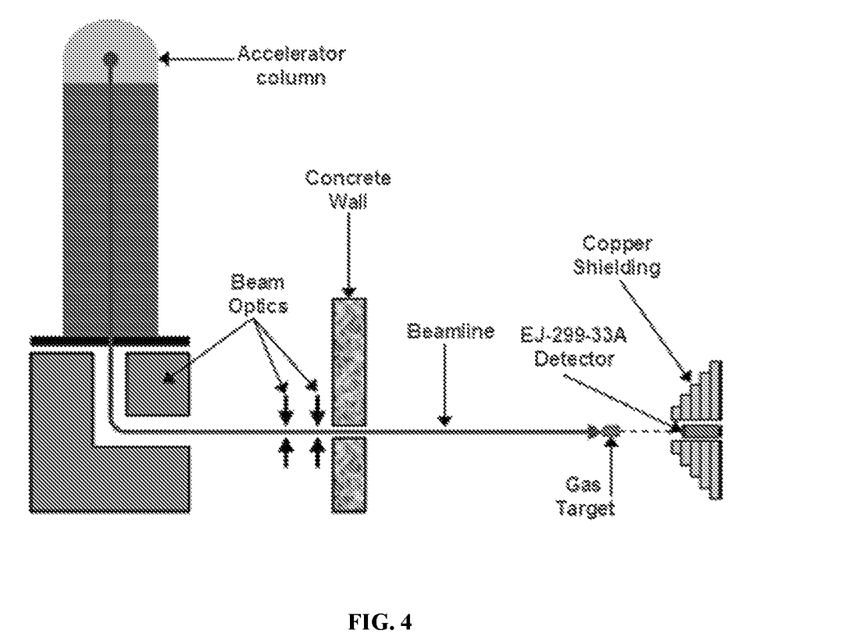
FIG. 4 illustrates an exemplary experimental setup using an accelerator, in accordance with various aspects of the present disclosure.

Monoenergetic neutron response functions for the EJ-299-33A plastic scintillator were measured with neutrons produced using a charge-particle accelerator (FIG. 4). Measurements were performed in energy ranges from 0.1 MeV to 8.2 MeV and 12.2 MeV to 20.2 MeV. By selecting the appropriate nuclear reaction and energy of incident charged particles, it was possible to take measurements for neutron energies within these ranges using steps as small as 0.1 MeV.

The accelerated charged particles were transported along the beam line to a 1 cm×3 cm gas cell with a thin molybdenum window. The EJ-299-33A detector was placed in the center of copper shielding, supported by an adjustable frame, which was positioned on top of a base that could be rotated around the target in a 150° arc. The copper shielding was used to reduce neutron scattering into the detector from the walls and other objects.

The position of the copper shielding on the frame was adjustable. The frame supporting the shielding was placed on wheels and could be moved along the rails of the base to position it closer to or farther from the target. This feature was necessary during measurements in order to avoid both extremely low count rates at backward angles and extremely high count rates at forward angles.

Figure 5:
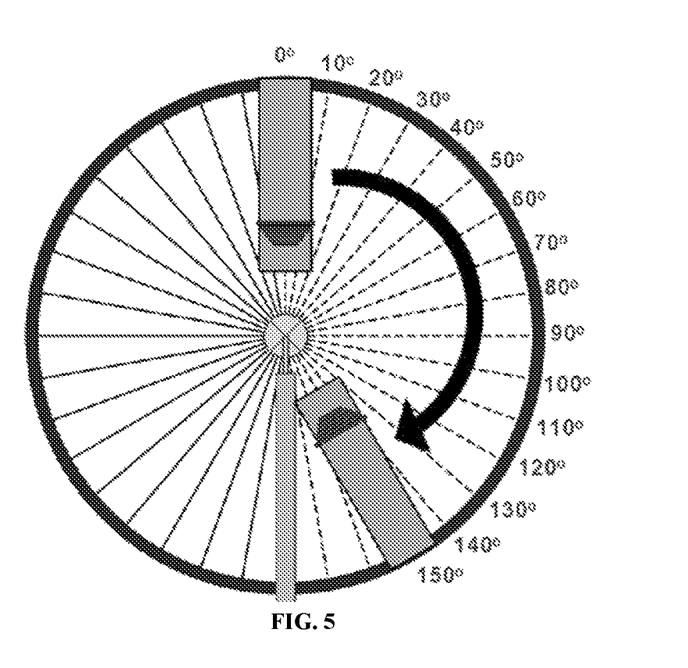
FIG. 5 illustrates an exemplary range of possible motion for a detector system, in accordance with various aspects of the present disclosure.

The angle of rotation of the frame for each measurement was set using a disc marked with 1° increments and positioned under the pivot point of the frame (FIG. 5). The disc's center was aligned with the center of the gas cell to provide an accurate reading of the angle at which the detector frame was positioned. The angle of the frame during measurements, combined with knowledge of the energies of the neutrons at 0° and the angular distribution of the emitted neutrons, was used to determine the value of the incident neutron energy for each recorded response function.

The $^3$H(p,n)$^3$He, $^2$H(d,n)$^3$He, and $^3$H(d,n)$^4$He reactions were used to produce monoenergetic neutrons to measure the desired set of response functions. For the $^3$H(p,n)$^3$He reaction (Q-value=−0.764 MeV), the gas target cell was filled with tritium at a pressure of 1 atm, and protons were accelerated to reach the required energy and transported through the beam line towards the target. In this nuclear reaction, the monoenergetic neutrons were produced with an energy that was dependent on the incident proton energy, which was precisely tuned by the accelerator voltage, and energy losses in the entrance foil of the gas cell and the gas. Proton beams with energies of 2.1 MeV and 4.2 MeV were used. These proton energies allowed for measuring response functions for neutrons between 0.1 MeV and 3.2 MeV.

For the $^2$H(d,n)$^3$He reaction, the gas cell was filled with deuterium, and the accelerated deuterons were incident on this target. The Q-value for this reaction is 3.269 MeV. The accelerator was tuned to produce deuteron beams with energies of 3.8, 4.7, and 5.2 MeV. These energy choices made it possible to measure monoenergetic neutron response functions between 3.3 MeV and 8.2 MeV for various angular orientations.

For the $^3$H(d,n)$^4$He reaction (Q-value=17.59 MeV), deuterons were accelerated and transported along the beam line towards the target cell filled with tritium gas. For deuterons in the range of 2 to 5 MeV, monoenergetic neutrons can be generated with the maximum energy between 19.6 MeV and 22.6 MeV. The accelerator was tuned to produce a deuteron beam with energy of 3.8 MeV in order to measure the monoenergetic neutron response functions between 12.2 MeV and 20.2 MeV.

To obtain a set of monoenergetic neutron responses for each combination of nuclear reaction and energy of incident charged particles, the effect of the angular distribution on neutron energy was used.

Based on the angular distribution dependence for angles between 0° and 150°, it was possible to select the neutron energies in 0.1-MeV steps to measure monoenergetic detector responses. The resulting neutron energies are shown in Table 1.

TABLE 1

Neutron energies used to measure response functions

| Nuclear Reaction | Energy of Incident Charged Particle | Neutron Energy Range |
|---|---|---|
| $^3$H(p,n)$^3$He | 2.1 MeV | 0.12 MeV to 0.63 MeV |
|  | 4.2 MeV | 0.70 MeV to 3.18 MeV |
| $^2$H(d,n)$^3$He | 3.8 MeV | 3.32 MeV to 6.77 MeV |
|  | 4.7 MeV | 7.01 MeV to 7.75 MeV |
|  | 5.2 MeV | 7.87 MeV to 8.24 MeV |
| $^3$H(d,n)$^4$He | 3.8 MeV | 12.20 MeV to 20.20 MeV |

Experimental data for each of the neutron energies were recorded for 220 buffers, and each buffer contained 340 waveforms. Count rates were kept in the range of 3,000 to 30,000 counts per second, with the average count rate remaining around 6,000 counts per second. Response functions were recorded in list mode, which allowed for the time, energy, and partial integral value for the voltage waveform to be recorded for each pulse generated by the detector. Using this mode, the partial integral values and energy for each pulse were used as the basis for performing the pulse-shape discrimination to distinguish signal waveforms generated by photons and neutrons. The pulse shape of a digitized waveform was compared with the expected patterns, which corresponded to the fast scintillation decay due to photon excitation and the slower decay induced by neutrons. The particle identification (PID) value was determined as the ratio of the partial integral of the tail of the waveform to the partial integral of the front part of the pulse (Eqn. 1):

$$PID=(total\ integral-partial\ integral)/partial\ integral \quad (1)$$

Figure 6:
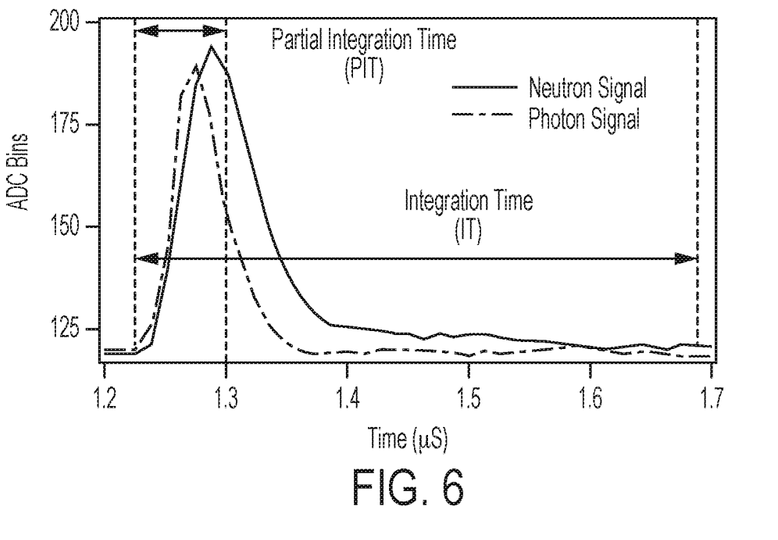
FIG. 6 illustrates a comparison of signals from neutrons and photons and the scheme for pulse-shape discrimination (PSD), in accordance with various aspects of the present disclosure.

The plot shown in FIG. 6 illustrates the time values used to calculate the partial and total integrals of a pulse. The integration time (IT) was defined by the duration of the pulse, and the partial integration time (PIT) was varied to achieve the best neutron/photon discrimination in the experiments. For the purposes of this analysis, the 'partial' integral was defined as the area under the curve between the start of the pulse (the signal amplitude above the set threshold) and the PIT value. The clock cycle of the analog-to-digital converter (ADC) of the digitizer was 12.5 nanoseconds. The partial integration time was 18 clock cycles (225 ns), and the IT was assigned a value of 1.25 µs. Since neutron-induced signals had longer tails than those for photons, the larger PID values correspond to neutrons. This distinction was used to discriminate between the signal waveforms of neutrons and photons.

Figure 7A:
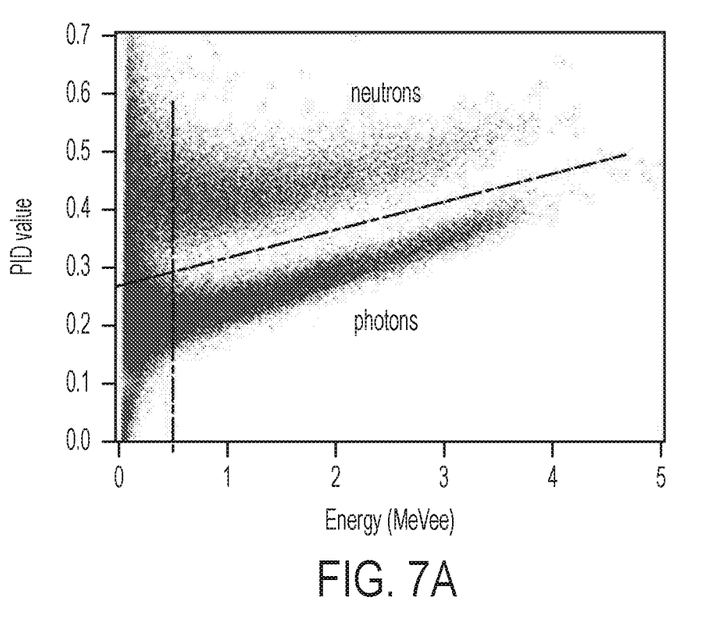
Figure 7B:
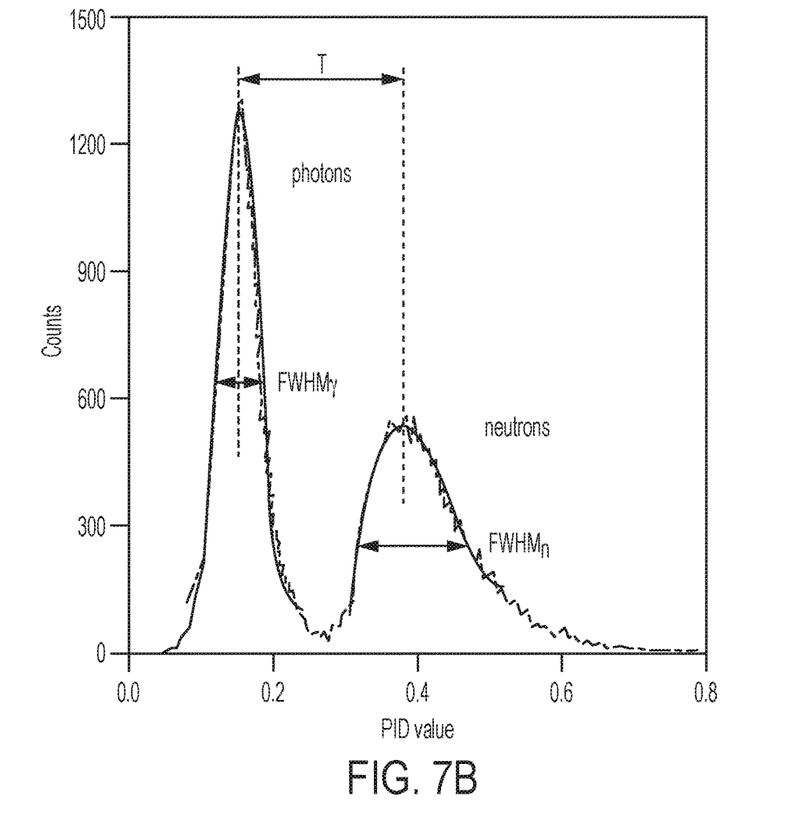

To test the detector response to gamma rays, $^{60}$Co and $^{137}$Cs sources were used, and a PuBe source was used to evaluate the PSD in the mixed neutron/photon field. The plot of the PID value against the particle energy is shown in FIG. 7A, and the corresponding plot of counts vs. the PID value is shown in FIG. 7B. The figure of merit (FOM) was determined as the ratio of the separation between two peaks to the sum of the full width at half maximum (FWHM) values for both peaks, resulting in the value of 1.3.

Figure 8A:
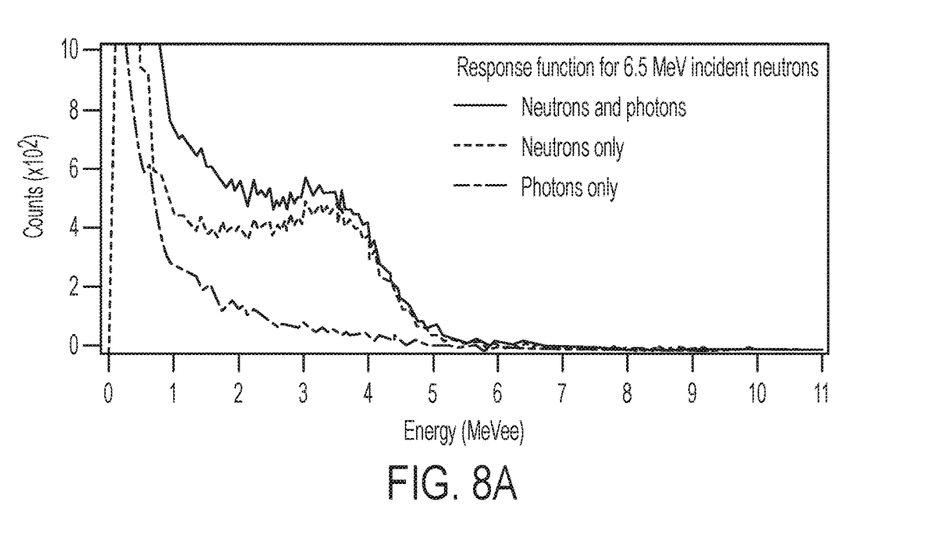
Figure 8B:
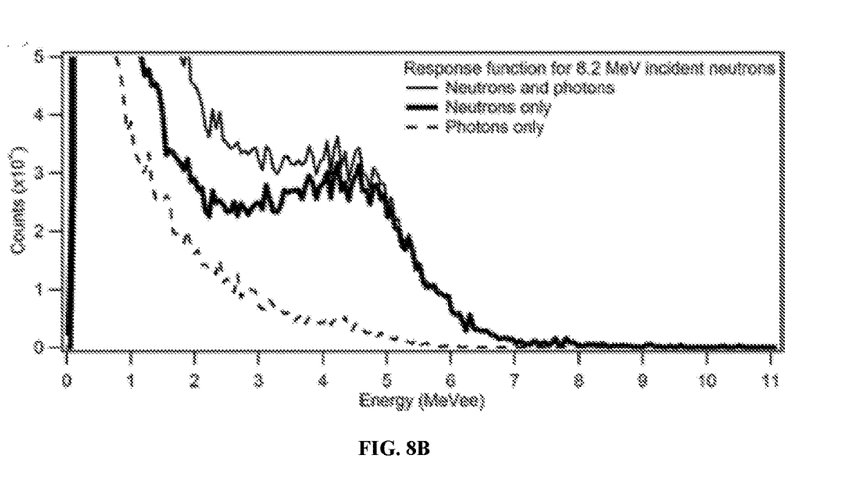
Figure 8C:
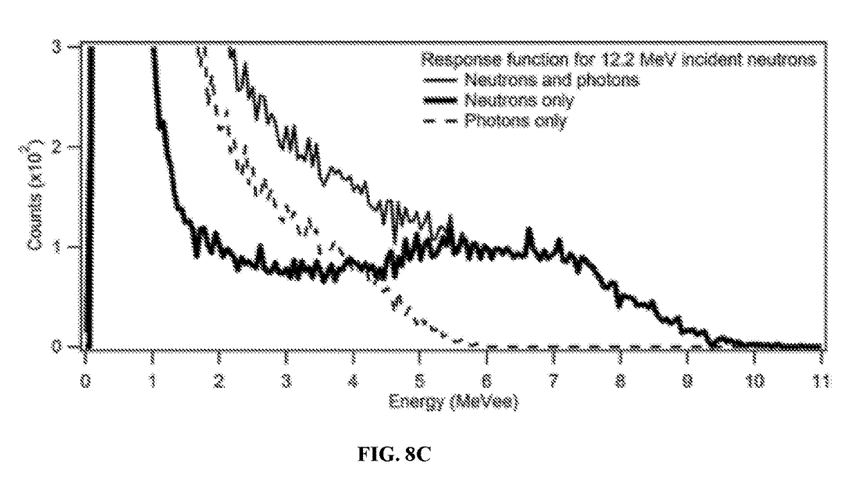

Because the detector recorded both neutron and photon pulses, it was necessary to implement a PSD procedure to isolate the neutron portion of the response function. FIGS. 8(A-C) show a comparison between the measured response function (neutron and gamma-ray events combined), the isolated neutron response function, and the discarded gamma-ray response function. As expected, the PSD led to the removal of photons, mainly at low energies, while preserving the response function features resulting from neutron events.

Figure 9A:
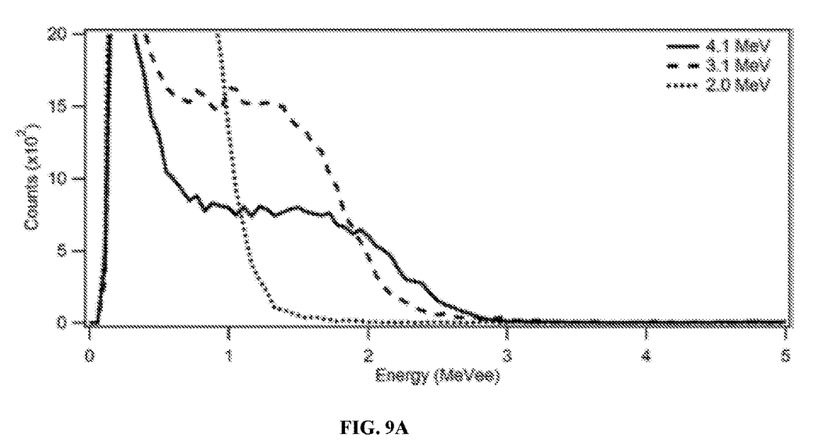
FIG. 9 illustrates neutron response functions for the indicated incident neutron energies, in accordance with various aspects of the present disclosure.
Figure 9B:
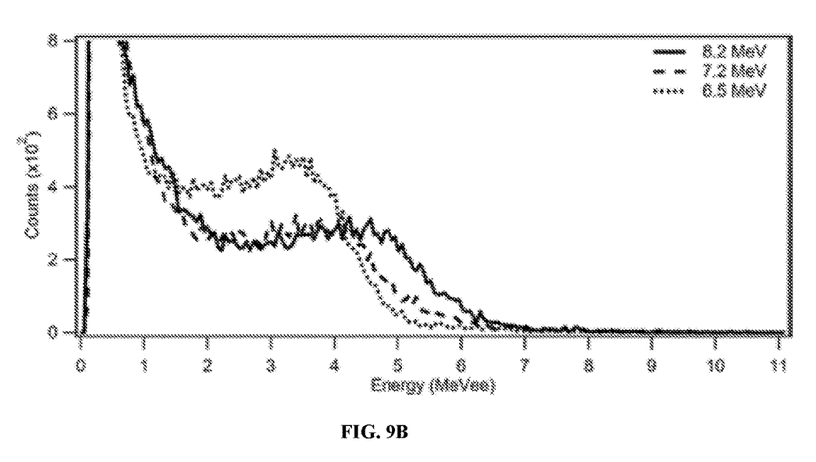
Figure 9C:
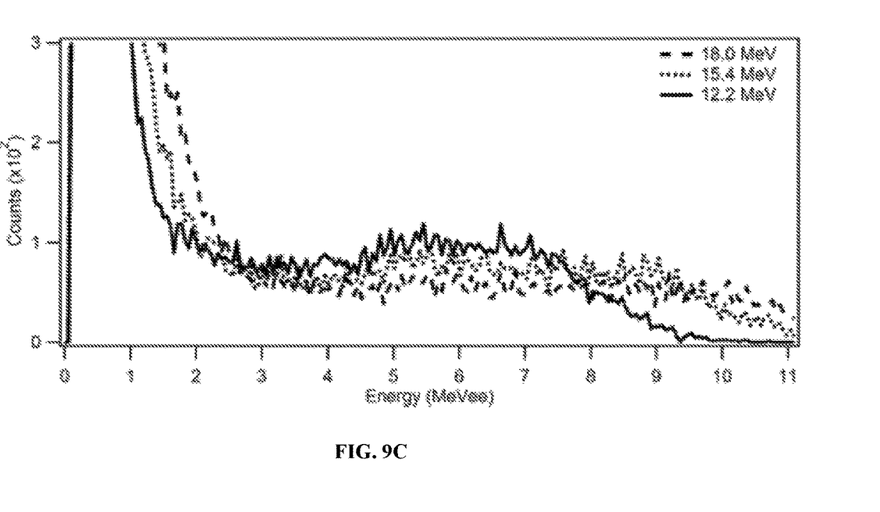
Figure 10A:
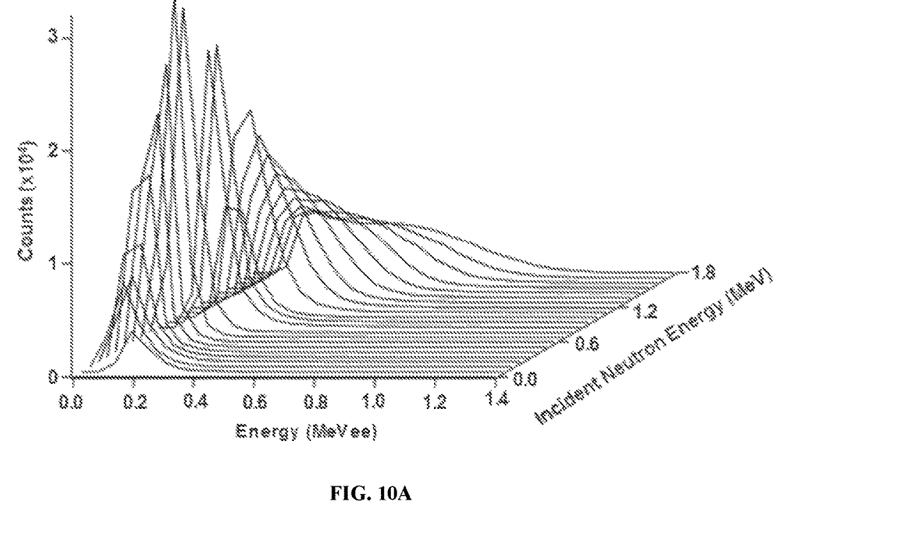
Figure 10B:
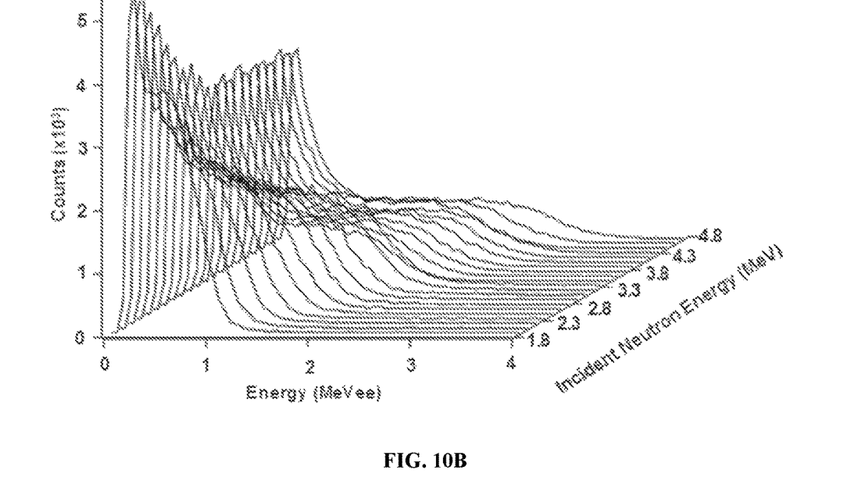
Figure 10C:
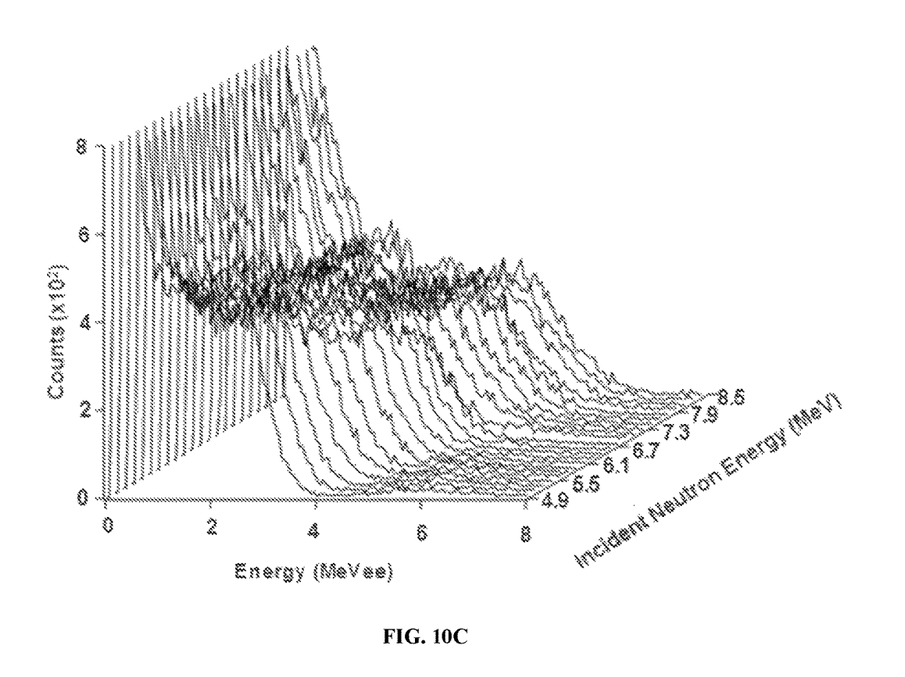
Figure 10D:
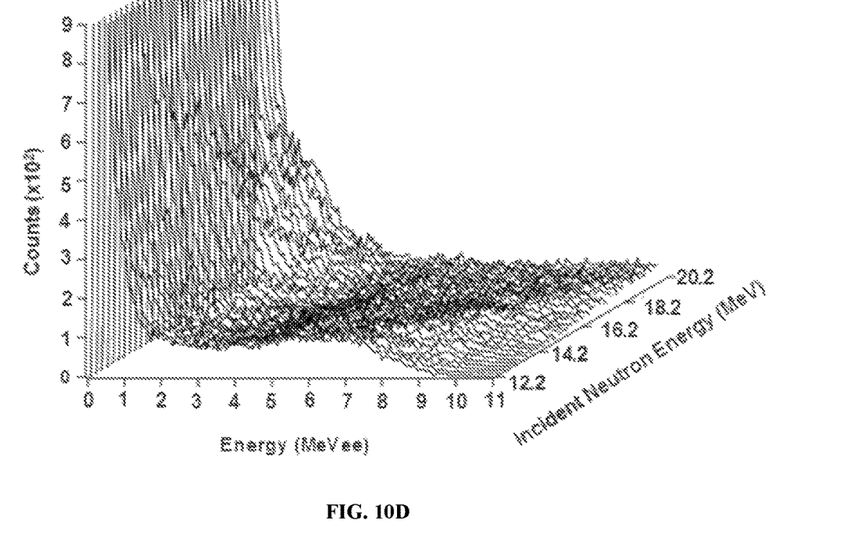

FIGS. 9(A-C) show a comparison of response functions measured for incident neutron energies of 2.0, 3.1, 4.1, 6.5, 7.2, 8.2, 12.2, 15.4, and 18.0 MeV. The removal of photon events from the measured responses reduced the magnitude of the resulting neutron responses, but did not significantly alter the shape of the response curves at higher energies (4 MeV to 20 MeV).

Combining these neutron response functions together as a surface plot provides a visualization of the unique features and how they change with respect to the energies of neutrons incident on the detector (see FIGS. 10A-10D). The monoenergetic response functions were plotted for source energies covering a range of 0.12 MeV and 20.2 MeV. A trend that appeared at the higher neutron energy was the 'spreading' of the response-function surface plot.

Spectral unfolding treats the multi-energetic detector output as the superposition of monoenergetic response functions. It is possible to use Eqn. 2 to represent the detector count rate (N) at a channel (i) as the sum of the monoenergetic response functions (R) for a given channel and energy (j) multiplied by a set of coefficients (S). Statistical error and deviations are taken into consideration by the remaining term, $e_i$.

$$N_i + e_i = \Sigma_j R_{ij} S_j \quad (2)$$

Figure 11:
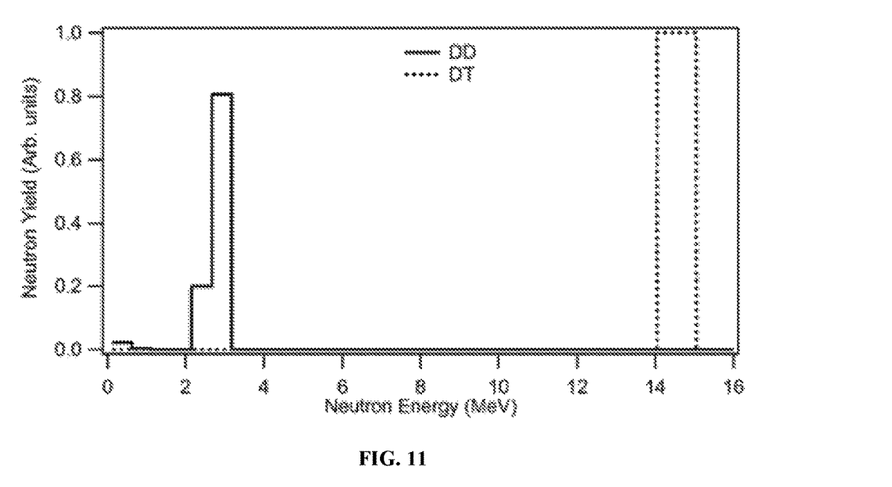
FIG. 11 illustrates unfolded coefficient distributions for simulated DD ($^2$H+$^2$H) and DT ($^2$H+$^3$H) neutron sources, in accordance with various aspects of the present disclosure.

Spectral unfolding was performed using the measured response functions and a least-squares regression. The detector responses to DD fusion neutrons (2.54 MeV) and DT fusion neutrons (14.1 MeV) were used. The results of the spectral unfolding are shown in FIG. 11. For the DD source, the expected neutron energy of 2.54 MeV was determined using 0.5-MeV steps between monoenergetic responses in the range from 0.5 to 20.2 MeV with an error of $3.9 \times 10^{-4}$.

A similar procedure using 1-MeV steps was found to be sufficient to identify the DT neutrons with an error of $1.2 \times 10^{-2}$.

In summary, the response functions for the EJ-299-33A scintillator for fast neutrons were obtained experimentally for neutron energies from 0.12 MeV to 8.2 MeV and from 12.2 MeV to 20.2 MeV in 0.1-MeV steps.

Without further elaboration, it is believed that one skilled in the art can, using the description herein, utilize the present invention. The following examples are included to provide addition guidance to those skilled in the art of practicing the claimed invention. The examples provided are merely representative of the work and contribute to the teaching of the present invention. Accordingly, these examples are not intended to limit the invention in any manner.

While aspects of the present invention can be described and claimed in a particular statutory class, such as the system statutory class, this is for convenience only and one of skill in the art will understand that each aspect of the present invention can be described and claimed in any statutory class. Unless otherwise expressly stated, it is in no way intended that any method or aspect set forth herein be construed as requiring that its steps be performed in a specific order. Accordingly, where a method claim does not specifically state that steps are to be limited to a specific order, no order is to be inferred.

Throughout this application, various publications are referenced. The disclosures of these publications in their entireties are hereby incorporated by reference into this application in order to more fully describe the state of the art to which this application pertains. The references disclosed are also individually and specifically incorporated by reference herein for the material contained in them that is discussed in the sentence in which the reference is relied upon. Nothing herein is to be construed as an admission that the present invention is not entitled to antedate such publication by virtue of prior invention. Further, the dates of publications provided herein can be different from the actual publication dates, which can require independent confirmation.

What is claimed is:

1. A method for detecting neutrons, the method comprising:
   (1) exposing a neutron detector comprising a plurality of scintillators, each having differing pulse shape characteristics, and an optical detector, to an area of interest,
   (2) detecting a signal, if present, from the optical detector, and then
   (3) analyzing the signal using a spectral unfolding technique to separate underlying signals arising from thermal neutrons, fast neutrons, and photons.

2. The method of claim 1, wherein the plurality of scintillators comprises a $^6$Li scintillator and a plastic scintillator.

3. The method of claim 1, wherein the optical detector comprises a photomultiplier tube, a solid-state photomultiplier array, a photodiode, or a combination thereof.

4. The method of claim 1, wherein analyzing the signals utilizes wavelet theory.

5. The method of claim 1, wherein the neutron detection system is portable, and wherein the area of interest comprises one or more of a shipping container, truck, nonproliferation site, nuclear material, or a combination thereof.

6. The method of claim 1, wherein the area of interest comprises a neutron source, and wherein information related to neutron energy and/or neutron flux is transmitted to the neutron source or an operator thereof, such that the neutron source can maintain a constant neutron output.

\* \* \* \* \*